US012632640B2

(12) United States Patent
Dasdan

(10) Patent No.: US 12,632,640 B2
(45) Date of Patent: May 19, 2026

(54) PLATFORM-AGNOSTIC DATA STORAGE AND RETRIEVAL IN A MULTIPLATFORM COMPUTING ENVIRONMENT

(71) Applicants:Atlassian Pty Ltd., Sydney (AU); Atlassian Inc., San Francisco, CA (US)

(72) Inventor: Ali Dasdan, Mountain View, CA (US)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 217 days.

(21) Appl. No.: 17/489,554

(22) Filed: Sep. 29, 2021

(65) Prior Publication Data

US 2023/0096930 A1    Mar. 30, 2023

(51) Int. Cl.
*G06F 40/106* (2020.01)
*G06F 9/451* (2018.01)
*G06F 16/901* (2019.01)
*G06F 16/903* (2019.01)
*G06F 16/93* (2019.01)

(52) U.S. Cl.
CPC ............ *G06F 40/106* (2020.01); *G06F 9/451* (2018.02); *G06F 16/9024* (2019.01); *G06F 16/90335* (2019.01); *G06F 16/93* (2019.01)

(58) Field of Classification Search
CPC ........ G06F 40/106; G06F 9/451; G06F 16/93; G06F 16/90335; G06F 16/9024
See application file for complete search history.

(56) References Cited

U.S. PATENT DOCUMENTS

| | | | | |
|---|---|---|---|---|
| 6,336,124 B1 * | 1/2002 | Alam | .................... | G06F 40/151 |
| | | | | 715/205 |
| 8,539,484 B1 * | 9/2013 | Offer | ................... | G06F 9/45558 |
| | | | | 718/1 |
| 9,280,401 B2 * | 3/2016 | LaCivita | ................. | G06F 9/541 |
| 9,563,613 B1 * | 2/2017 | Dinkel | .................. | G06F 40/186 |
| 9,652,447 B2 * | 5/2017 | Augustine | ............ | G06F 40/186 |
| 9,773,051 B2 * | 9/2017 | Smith | ................. | G06F 16/1824 |
| 10,402,035 B1 * | 9/2019 | Jose | ........................ | G06F 9/451 |
| 11,748,051 B2 * | 9/2023 | Shiohara | ............ | G06K 15/1805 |
| | | | | 358/1.15 |
| 2002/0062406 A1 * | 5/2002 | Chang | .................... | G06Q 20/32 |
| | | | | 710/1 |
| 2006/0101329 A1 * | 5/2006 | Han | ........................ | G06F 16/88 |
| | | | | 715/239 |
| 2012/0143958 A1 * | 6/2012 | Augustine | .............. | G06Q 10/10 |
| | | | | 709/205 |
| 2012/0192055 A1 * | 7/2012 | Antebi | .................. | G06F 40/197 |
| | | | | 715/229 |
| 2013/0212707 A1 * | 8/2013 | Donahue | ............ | G06F 21/6218 |
| | | | | 726/29 |
| 2013/0265592 A1 * | 10/2013 | Bellagamba | ....... | G06Q 30/0276 |
| | | | | 358/1.6 |

(Continued)

*Primary Examiner* — Scott T Baderman
*Assistant Examiner* — Mario M Velez-Lopez
(74) *Attorney, Agent, or Firm* — Brownstein Hyatt Farber Schreck, LLP

(57) ABSTRACT

A data storage system instantiates a graph data structure to store platform-agnostic atomic data units of organization-owned content in a multiplatform computing environment. Each atomic data unit can be accessed by any platform in the multiplatform computing environment and may be included in or referenced by any document, object, or other platform-specific data structure.

18 Claims, 7 Drawing Sheets

(56) References Cited

U.S. PATENT DOCUMENTS

| | | | |
|---|---|---|---|
| 2016/0179454 A1* | 6/2016 | Liu | G06F 3/04886 |
| | | | 715/747 |
| 2017/0188213 A1* | 6/2017 | Nirantar | H04L 67/564 |
| 2018/0232352 A1* | 8/2018 | Fulford | G09B 5/00 |
| 2018/0357304 A1* | 12/2018 | Balasubrahmanian | |
| | | | G06F 16/252 |
| 2019/0108204 A1* | 4/2019 | Ghosh | G06F 40/151 |
| 2019/0318020 A1* | 10/2019 | Chauhan | G06F 11/0709 |
| 2020/0012623 A1* | 1/2020 | Cole | G06F 16/252 |
| 2020/0242710 A1* | 7/2020 | Krovvidi | G06F 16/93 |
| 2020/0272324 A1* | 8/2020 | Chanda | G06F 9/451 |
| 2020/0311680 A1* | 10/2020 | Wahl | G06Q 10/101 |

* cited by examiner

100

CLIENT DEVICE — 104

DISPLAY — 104a

MEMORY — 104b

PROCESSOR — 104c

HOST SERVICE

— 102

106 — SOFTWARE PLATFORM

106a — RESOURCE ALLOCATION(S)

SOFTWARE PLATFORM — 108

RESOURCE ALLOCATION(S) — 108a

PLATFORM-AGNOSTIC DATA STORE — 110

RESOURCE ALLOCATION(S) — 110a

200 https://platform.domain.tld/organization/space/page GO ~202

~204

206

400

402

406

```
[{
  index : 0,
  el_id : 345,
  fmt : Formats.Para,      }408
  children : [1],
  parent : -1
},
{
  index : 1,
  el_id : 456,
  fmt : Formats.Table,     }412
  children : [],
  parent : 0
}]
```

600

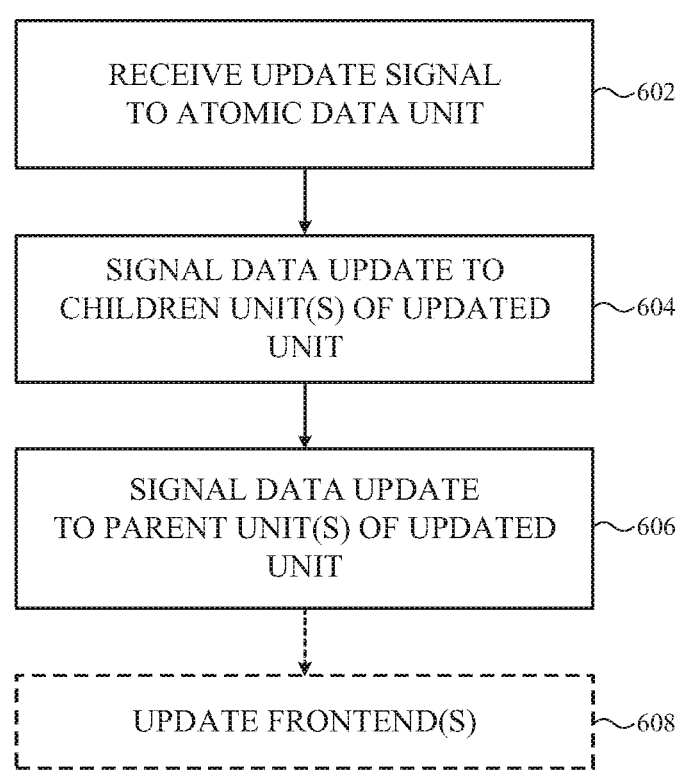

```
┌──────────────────────────────┐
│      RECEIVE UPDATE SIGNAL    │──602
│      TO ATOMIC DATA UNIT      │
└──────────────────────────────┘
                │
                ▼
┌──────────────────────────────┐
│      SIGNAL DATA UPDATE TO    │
│   CHILDREN UNIT(S) OF UPDATED │──604
│             UNIT              │
└──────────────────────────────┘
                │
                ▼
┌──────────────────────────────┐
│      SIGNAL DATA UPDATE       │
│  TO PARENT UNIT(S) OF UPDATED │──606
│             UNIT              │
└──────────────────────────────┘
                ┆
                ▼
┌ ─ ─ ─ ─ ─ ─ ─ ─ ─ ─ ─ ─ ─ ─ ┐
     UPDATE FRONTEND(S)         ──608
└ ─ ─ ─ ─ ─ ─ ─ ─ ─ ─ ─ ─ ─ ─ ┘
```

RECEIVE REQUEST TO RENDER
PLATFORM-SPECIFIC OBJECT
~702

ACCESS ROOT NODE
CORRESPONDING TO PLATFORM-
SPECIFIC OBJECT
~704

TRAVERSE PLATFORM-AGNOSTIC
DATA STORE AND ACCESS
REFERENCED AUTOMATION/
TRANSFORM DATASTORE TO
ASSEMBLE PLATFORM-SPECIFIC
OBJECT
~706

COMMUNICATE PLATFORM-
SPECIFIC OBJECT TO FRONTEND
INSTANCE OF PLATFORM
~708

PLATFORM-AGNOSTIC DATA STORAGE AND RETRIEVAL IN A MULTIPLATFORM COMPUTING ENVIRONMENT

FIELD

Embodiments described herein relate to data storage in multiplatform computing environments and, in particular, to systems and methods for storing and retrieving data in a multiplatform computing environment.

BACKGROUND

An organization can establish a collaborative work environment by self-hosting, or providing its employees with access to, one or more platforms or services to facilitate cooperation and completion of work related to common goals. Such organizations typically rely on each individual platform (or, more specifically, owners or vendors of each platform) to manage access to, and distribution of, organization-owned data associated with each respective platform.

As a result, databases and database management systems of each platform used by an organization must be regularly and separately monitored, audited, and updated—a requirement that introduces substantial cost for a business. Furthermore, to share data between platforms, platform-specific integrations and/or bridge applications must be developed and separately maintained.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

FIG. 6 is a flowchart depicting example operations of a method of operating a platform-agnostic object graph/data store as described herein.

The use of the same or similar reference numerals in different figures indicates similar, related, or identical items.

DETAILED DESCRIPTION

Figure 1:
FIG. 1 depicts a simplified system diagram of a collaborative work environment leveraging a platform-agnostic object graph/data store, such as described herein.

Embodiments described herein relate to systems and methods for storing, formatting, transforming, and retrieving organization-owned data that may be created (and later accessed) when leveraging software as a service (herein a "software service" or "platform").

As used herein, the phrase "organization-owned data" may be used to refer to any and all content, data, metadata, or other information regardless of form or format that is authored, developed, created, or otherwise added by, edited by, (or otherwise provided for the benefit of), a user of a software service. Organization-owned data can include personal data, private data, health information, personally-identifying information, business information, trade secret content, copyrighted content or information, restricted access information, research and development information, classified information, mutually-owned information (e.g., with a third party or government entity), or any other information.

In many examples, although not required, organization-owned data may include information that is classified in some manner, according to some procedure or protocol. In many cases, although not required, organization-owned data may include information or content that is accessible to only particular persons or roles within an organization; authentication and authorization rules may control access to and/or modification of such organization-owned information.

In many cases, organization-owned data may be distributed through many different software tools used by that organization. For example, email data may be stored in a database of an email service, telephone logs or messaging content may be stored in a database of a communication service, documentation may be stored in a documentation database of a document management system, issue/bug report data may be stored in a database of an issue tracking system, project/task information may be stored in a database of a project management system, and so on.

Storing data in this manner has many disadvantages and risks. For example, information technology personnel of the organization must regularly maintain and update each individual platform to ensure that data stored by that platform is well-protected. In addition, sharing data between platforms is both cumbersome and difficult. For example, if the organization has a need for data stored by a first platform to be accessed by a second platform, some intermediate service, often referred to as a bridge application or an integration, may be required. For example, an organization may operate both a documentation service and an issue tracking service.

It may be advantageous to display issue status information from within the documentation service. In this example, an integration between the documentation service and the issue tracking service is required; the integration handles communications between the documentation service and the issue tracking service via application programming interfaces (APIs) thereof so that organization-owned data from the issue tracking service can be received by and displayed in a frontend of the documentation service.

In this preceding example, the integration is a critical element of the system architecture; errors in the integration or unexpected behaviors of the integration can cause unexpected behaviors or data loss in either or both the documentation service or the issue tracking service. Similarly, the integration must be separately maintained; if either the documentation service or the issue tracking service are updated, the integration may also be required to be updated.

These foregoing problems with existing architectures are not exhaustive. For example, in other cases, the fact that an organization's data is distributed and fractured may, itself, be problematic. For example, in some cases, the organization may be required by a legal authority to produce data or delete data, which in turn may require the organization to access multiple databases, in multiple formats, across multiple services to fulfill the request to produce or delete data.

In yet other examples, different platforms storing different data in different formats may present formatting challenges for organizations that benefit from sharing data between platforms. For example, issue tracking data stored by an issue tracking service may be stored and/or served by the issue tracking service (via an API request) in a format that is not natively displayable in a documentation service, such as described above. In such examples, one of the issue tracking service, the documentation service, and/or an integration coupling the two may be required to reformat, transform, or otherwise change data from the issue tracking service to a form or format suitable for the documentation service.

In still other examples, it may be required (e.g., by an integration), to parse data returned from one platform before returning that data to another platform. In other words, certain platforms may return, in response to API requests, more data or content than is required. As one example, a documentation service API may not be configured to return parts, portions, or subsets of document objects; the documentation service may only support requesting, modifying, and returning full document objects. In some cases, another platform requesting information from the documentation service may be required to further parse a full document object to obtain desired data or information.

In view of the foregoing, generally and broadly, it may be appreciated that distribution of an organization's data across multiple platforms introduces maintenance and control challenges, data sharing challenges, data access challenges, inter-platform data parsing requirements, data format/transformation challenges, and so on.

To address these and other concerns, embodiments described herein rearchitect multiplatform data storage to reclaim control over, and access to, organization-owned data. In particular, organization-owned data (regardless of platform with which that data is associated) is stored in a graph data structure, the nodes of which store platform-agnostic atomic units of organization-owned data and the edges of which define one or more transforms, aggregations, modifications, formats, and so on of the atomic units of organization-owned data.

In this manner, a graph data structure instantiated by a data storage system or service as described herein can be operated to both (1) store any suitable quantity of data and (2) to serve that data in any suitable form or format by coupling transforms/edges to suitable atomic data unit nodes. As may be appreciated by a person of skill in the art, this data storage model can exhibit substantial advantages over traditional relational databases, as normalization of data (e.g., atomic data units) into one or more interrelated and associated tables is not required. Furthermore, querying the graph data structure may only require traversing the structure from node to node via suitable edges, which may be substantially more efficient than, and faster than, a query of a relational database that requires one or more join operations, filtering operations, or other multi-table or multi-database operations to service the query.

Further still a graph data structure as described herein may be substantially more storage space efficient than a traditional relational database at least due to the fact that relational databases expressly require reserving storage space for relationship identifiers defining associations between tables and databases. For example, a single record of a single table may include multiple index-based fields, each of which refer to other records or other tables. These index-based fields require storage space and for large organizations, may represent a substantial fraction of overall data storage costs.

Further still, a graph data structure leveraged in a multiplatform computing environment as described herein may be substantially more storage space efficient than a traditional database (e.g., relational database) at least because a graph data structure eliminates cross-platform redundancy. For example, usernames associated with accounts of different platforms may be stored by each independent platform in a conventional multiplatform computing environment. By contrast, a graph data structure enables an architecture in which each individual platform can leverage a single username field of a single user account higher-order object, thereby eliminating redundant storage of data and the possibility that changes to data in one platform cause data in other platforms to become stale.

More broadly, a data structure—or in particular a data storage system—as described herein can be configured to store platform-agnostic data in a platform-agnostic format and can provide as output any form or format of that data to any suitable endpoint. As a result of these systems and data structures as described herein, an organization can centralize control of all atomic units of data owned by that organization, regardless of in which platform in a multiplatform system those atomic units of data were created or modified.

In these embodiments, each atomic data unit (also referred to as a "data item") is associated with a unique identifier, which may be universally unique across all platforms within an organization's multiplatform computing environment. As a result of this architecture, any platform in a multiplatform computing environment that references a particular atomic data unit only needs to query the graph data structure of that organization with the unique identifier associated with that atomic data unit to obtain a copy of or address of the atomic data unit.

In this manner, and as a result of the data architecture and system described herein, each atomic data unit owned by and/or created by the organization can be uniquely identified across the entire organization, regardless of which platform accesses and/or displays that data for end users.

Further still, in some embodiments, each atomic data unit can be hashed such that if identical data is later created in the same computing environment, new atomic data unit creation is not required; merely a reference to the already-existing data can be used. As may be appreciated, this dramatically reduces and/or eliminates redundant data storage by an organization operating a multiplatform computing environment.

In many examples, a platform may associate structure sets of atomic data units stored in a graph or other suitable data storage structure as described herein into higher-order objects, which in some examples can be formatted and/or organized in a platform-specific manner. In some cases, individual nodes of a graph data structure can be associated with platform-specific groupings and/or arrangements of atomic data units. In these constructions, a particular platform may call to higher-order platform-specific nodes that, in turn reference platform-agnostic atomic data units also stored in the graph. In this manner, different platforms can maintain different data formats and/or data structures while also accessing the same data.

In some cases, these higher-order objects can be called object maps, or platform-specific documents. For example, a documentation platform may organize data into "document objects" which in turn include multiple independent atomic data units structured together in some structured format specific to the documentation platform. In another examples, an issue tracking system may organize data into "issue objects" which in turn may include multiple independent atomic data units structured together in some structured format specific to the issue tracking system. In each of these examples, a single atomic data unit can be referenced in a document object (when accessed/used by the documentation platform) while also being referenced in an issue object (when accessed/used by the issue tracking system).

In many cases, higher-order objects can be created at least in part by leveraging one or more automation/transform nodes of a platform-agnostic data store as described herein. In particular, an automation/transform node can be configured to perform a particular transform and/or format operation against an input provided to that node. For example, a given automation/transform node may be configured to transform a comma-delimited dataset stored as an atomic data unit in a graph structure (as described herein) into a pie chart with a particular format. A different automation/transform node can be configured to receive as input the same comma-delimited dataset and to provide an HTML-formatted table as output. In another example, another automation/transform node can be configured to calculate one or more metadata values from one or more values of the comma-delimited dataset. It may be appreciated that these examples are not exhaustive, and an automation/transform node can be configured to receive as input any atomic data unit (or multiple atomic data units) and may be configured to output any suitable form, format, or presentation of data or content.

In many cases, a set of automation/transform nodes can be stored and/or accessed by users of a multiplatform system. In addition, users of a multiplatform system may be presented with one or more options to add, configure, or otherwise modify one or more automation/transform nodes. In this manner, as a platform-agnostic data store as described herein is used by an organization, over time, a diverse set of automation/transform nodes may be created by users of that platform such that any suitable data stored by the data store as atomic data units can be converted or transformed to any other suitable data, for example as an element of a platform-specific data object.

In view of the foregoing, it may be appreciated that, any data format or document format can be generated/output by a system as described herein in order to mirror document formats of conventionally-implemented platforms used by an organization. In this manner, a data storage system as described herein can be transparently implemented as a data storage backend to any suitable number of platforms, as platform-specific data structures and API responses can be generated by the data storage system by leveraging platform-specific mappings of atomic data units, transformed and/or formatted according to edges associated with those atomic data units.

For example, in one embodiment, a documentation system can be used by an organization to document a software product. The documentation system can include multiple pages, each of which provides description of a particular feature of the software product. In some cases, a notice paragraph may be included as the last paragraph of each page.

In a conventionally-implemented documentation system, the notice paragraph is required to be copied whenever a new page is generated in the documentation system. In some cases, a new page template may include the notice paragraph already.

However, as may be readily appreciated by a person of skill in the art, if content of the notice paragraph needs to be changed, each page of the documentation system must be retrieved from memory, modified with the updated notice paragraph language, and saved to memory. This task may be automated, but it nevertheless is cumbersome and time consuming.

By contrast, a data storage system as described herein may store the notice paragraph as an atomic data unit. In this example, each page of the documentation system may be a mapping of atomic data units, one of which is the notice paragraph. In this example, a single modification to the atomic data unit storing the notice paragraph text may be changed, after which every single document/page that references the notice paragraph may be automatically updated and changed.

In another example, a documentation system may include multiple pages each of which may have certain format options for text contained therein. For example, titles may have a first style, body blocks may have a second style, and so on. In a conventionally-implemented system, cascading style sheets (CSS) may be used to try and harmonize look and feel of each page throughout the documentation system. However, as known to a person of skill in the art, CSS documents are often cached by computing networks and end user devices. In some cases, cached CSS documents may be cached for a period of time that the organization cannot control (e.g., by an Internet Service Provider or an end user device). As a result of caching, any change the organization makes to the master CSS document may take an unknowable time to propagate to all users of the documentation service. This, in turn, may provide an undesirable albeit temporary user experience for certain users.

In other conventionally-implemented systems, document styling may be controlled by in-line style attributes, which in turn must be stored in each respective page/document stored by the documentation system.

By contrast a system as described herein can define style attributes of particular atomic data units as separate atomic data units; in other words, text content of a title of a page may be stored as a first atomic data unit and a second atomic data unit may store a style for all titles associated with the documentation system. In this example, as with preceding examples, a single modification to the atomic data unit storing the style data for all titles may be changed, after which every single document/page that includes a title may be stylistically automatically updated and changed.

In other examples, atomic data units can be used between different platforms. For example, a documentation system can include a page that contains text content describing a particular project tracked by a project management system. In this example, project data or information may be displayed and/or shown in a frontend of both the project management system and the documentation system. As one example, a project title and a project status may be shown in both the documentation system and the project management system.

In a simple conventionally-implemented system, the title and project status information (along with any other shared information) must be manually synchronized between platforms, an obviously arduous task.

In more sophisticated conventionally-implemented systems, an integration between the documentation system and the project management system may be configured to leverage APIs of both systems to ensure that data—such as project title and project status information—is synchronized between those systems. In these examples, fast operation of the integration is required to ensure that frontend users of the project management system and the documentation system are presented current and fresh information; if the integration between the platforms has not yet synchronized a change made in one platform, a user of the second platform may be presented with old or outdated information.

By contrast, a system as described herein can store a title as a first atomic data unit and the project status as a second atomic data unit. The title data unit may be mapped into a page/document of the documentation system while also being mapped into a project object of the project management system. In other words, the same data object—the atomic data unit that stores the title—is used by two separate systems.

This architecture ensures that the moment a user of the documentation system propagates a change to the project title, that change is automatically received by the project management system. The reverse is likewise true. No synchronization operation is required, no integration system is required. Because both platforms utilize the same data service, changes made in one platform are automatically received by the second platform. The same example is true for project status, or any other cross-platform data stored and retrieved as described herein.

In further examples of the preceding embodiment, in some cases, a graph data structure as described herein can be configured to notify one or more platforms and/or one or more frontends of one or more platforms that data has changed, or has been changed, and should be reloaded or refreshed at all frontends currently rending content based on the updated atomic data unit.

For example, in some embodiments, an atomic data unit itself can generate a notification that its content has changed. In such examples, each atomic data unit can generate a signal or other communication/notification to each other atomic data unit to which that data unit is associated (e.g., via one or more edges). In this manner and as a result of this construction, an update to a given atomic data unit can be propagated to all connected nodes of the graph data structure as efficiently and quickly as possible.

In yet other examples, a graph data structure as described herein can be leveraged to render, display, or otherwise visually present data in a different manner depending upon which edges couple to which other nodes of the graph data structure. In other examples, transform nodes can be included in the graph data structure that transform data from other nodes into a particular format or form.

In yet other examples, a node of the graph data structure can be configured to aggregate certain content of a set of atomic data units into a higher-order object, such as a table or graphic representation of data. For example, dozens or hundreds of atomic data units storing numerical values or data can be aggregated by a single table node that merges all associated atomic data units into a single tabular data structure that, in turn, can be consumed as tabular data by one or more platforms.

Continuing the preceding example, in some embodiments, a node of the graph data structure can be configured to pivot, filter, or otherwise modify tabular data (or any other aggregating data node's content) into another form or format. For example, a node may be configured to consume tabular data and to output a graphical representation of that data, such as a chart or other graphic. In another example, the node may be configured to calculate one or more derived values from the tabular data, such statistical values describing the input tabular data. In yet other cases, two or more tables can be joined together into a single logical dataset.

In each of these preceding examples, it may be appreciated that in some implementations, higher-order nodes of the graph data structure may be configured to merely map one or more atomic data units together based on those data unit's unique identifiers. In other examples, nodes can be configured to perform one or more computational operations and/or transforms on data input thereto. In these constructions, any suitable presentation, form or format of data can be generated by a graph data structure and the associated data storage system instantiating the same, as described herein.

For example, some nodes may be configured to consume numerical atomic data unit content as input, and provide an output formatted as JSON. In other cases, a node may be configured to consume plaintext atomic data unit content as input and to provide sentiment analysis as output. In other cases, a node may be configured to consume any atomic data unit and provide an output casting that input as a string, integer, date, or other structured object. In some cases, a node may be configured to consume tabular content as input, and to provide a graphical representation of that tabular content as output (e.g., pie chart, line graph, Gantt chart, and so on).

In other examples, some nodes can be configured to consume content from specifically identified atomic data units or other nodes and can be configured to provide as output a structured data representation aggregating that data HTML, XML, JSON, or another structured format. In yet other examples, some nodes can be configured to consume graphical content (e.g., photos, video media, and so on) and provide as output one or more machine vision outputs, such as content detection, content description, motion tracking, and so on.

It may be appreciated that the foregoing examples are not exhaustive; a person of skill in the art may readily appreciate that a graph data structure as described herein can be configured to store any suitable platform-agnostic data, in any suitable format, and can be configured to transform and present that data in any suitable visual format, structured data format, and so on. As a result, a data storage system/data management system as described herein that instantiates a graph data structure as described herein can be leveraged as a data-serving backend of any suitable platform of a multiplatform environment.

More generally, a graph data structure as described herein can be configured to store platform-agnostic data and/or platform-specific groupings of that data, in a multiplatform computing environment. For example, document objects as defined by a document management system may each include a mapping of different atomic data units (and/or collections of atomic data units, represented as other nodes of the graph data structure), some of which may be transformed in some manner or another (e.g., formatted), some of which may be higher-order nodes (e.g., tabular data, graphics, and so on), and some of which may be format information (e.g., style definitions, and so on). In these examples, a platform-specific mapping of atomic data units and other nodes and edges can also include relative display/positional information. For example, information defining where information/data should appear when rendered in a front end.

In this manner, generally and broadly, a graph data structure as described herein can be configured to store platform-agnostic data (as atomic data units) and can be configured to provide as output platform-specific structured data. In a more general sense, the phrase "platform-agnostic" can be used to refer to data that is stored and/or accessed in a manner that is not specific to any particular platform.

As noted above, an "atomic data unit" as described herein can store any suitable quantity of data in any suitable format. In some cases, an atomic data unit may be configured to store text content, such as words, sentences, paragraphs, phrases, or sections of a long-form document. In other cases, an atomic data unit can store numerical values. In yet other cases, an atomic data unit can store date objects, string objects, structured data, database files, media files, schemas, API definitions, validation configurations, and so on. Any suitable data, at any suitable level of abstraction, can be stored in an atomic data unit as described herein.

Further an atomic data unit as described herein can be implemented/structured in a number of ways. For example, in some cases, an atomic data unit can be a structured data object stored at a particular address in physical memory. In a simplified example, an atomic data unit as described herein may be JSON formatted, such as:

```
newAtom0 = {
    universal_id = 0,
    platform1_id = 123,
    platform2_id=876,
    platform7_id=1234,
    hash = 0x123456,
    type = types.EmployeeName,
    data = "John W. Smith"
}
```

In this example, an atomic data unit can store a string that represents an employee's name. The atomic data unit has a universal index of 0. In this manner, any other node (e.g., child nodes, parent nodes, format nodes, other nodes, and so on) that reference the node index 0 can access the content from the data attribute of "John W. Smith." In some cases, one or more edges or format nodes can be leveraged to return a particularly-formatted version/transformed version of the content of the atomic data unit, such as by just returning the first name "John" or the last name "Smith."

As indicated above, an atomic data unit as described herein can include multiple discrete indexes, some of which may be universally unique identifiers, some of which may be platform-specific identifiers.

As noted above, this example atomic data unit can be referenced by any suitable number of platforms, in any suitable number of object maps (e.g., platform documents or objects). For example, a documentation service may include a document object that lists all employees. This document of the documentation system can reference the atomic data unit 0 so that John W. Smith's name appears in the listing of employees when the document object is rendered in a frontend of the documentation system. For example, in some embodiments, the document object may be an XML-formatted document that references the atomic data unit above. As one example, the document object referencing the atomic data unit may be stored in a datastore as:

```
<document>
    <title>All Employees</title>
    <employee>{{(atomic_data_units.id==0).data}}</em-
        ployee>
</document>
```

The same atomic data unit may also be referenced by any other suitable platform of a multiplatform, such as a project management platform. In this example, the project management platform may be configured to store project information in project directory objects, which may be formatted in a structured format such as JSON or XML. For example, an example project directory object may be:

```
{
    project: 1,
    title : "Email Application"
    project_lead : {{(atomic_data_units.id == 0).data}}
}
```

A person of skill in the art may readily appreciate that these foregoing examples are not exhaustive of the various types of documents or objects that may leverage benefit from a data storage system as described herein. In particular, it may be clear that as a result of the example architectures described herein, any change made to any atomic data unit by any platform in a multiplatform environment, is automatically propagated to—and displayed in—any platform page or object that references that data. For example, if John W. Smith of the preceding example changes his preferred name to Johnathan W. Smith, both the document object in the documentation system and the project directory object in the project management platform may automatically display the updated name Johnathan W. Smith.

Embodiments described herein may be particularly useful to an organization self-hosting, or providing its employees with access to, a number of different platforms and/or software services to establish a collaborative, cooperative and efficient work environment. Herein, such software services can be referred to as "collaboration tools" or "collaboration services."

Example collaboration services such as described herein can include but may not be limited to: messaging services; telecommunication services; videoconferencing services; issue tracking services; repository services; documentation services; document management systems; knowledge sharing systems; project management services; enterprise resource planning services; supply chain management services; and so on.

Any content added to any of these services, including input(s) provided to customize a particular instance (or tenant experience) of a particular collaboration service, can be considered organization-owned content or data that can be subdivided or fractured into individual atomic data units, as described herein. In addition, any content and/or parts of content can be stored in a graph data structure as described herein, distilled to individual atomic data units as described above.

One example of a collaboration service/software service, as described herein, is a project management system or tool that can be implemented in whole or in part as an instance (or tenant of an instance) of software executed by a container, a virtual server, or a physical server (or other computing appliance or combination of appliances) that provides a team of individuals with a means for communicating and exchanging information with one another. All information exchanged through and/or added to a project management system or tool can be considered organization-owned data (represented as a single atomic data unit or as a mapping or collection of multiple atomic data units), as described herein.

In some examples, a collaboration service can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors ("bugs"). Each data item associated with each above-described function can be considered organization-owned data—which can be fractured/subdivided into any granularity of atomic data units—as described herein.

In other cases, a collaboration service can be configured for non-software related purposes, such as for use by a human resources team, an information technology support group, and so on. As with other examples introduced above, any configuration or addition of information to any collaboration service described herein can be considered organization-owned data, as described herein.

In view of the foregoing it may be appreciated that generally and broadly a collaboration service, such as described herein, can be used to (1) facilitate exchange any quantity of organization-owned data objects (each of which can include and/or can reference any suitable number of atomic data units) including files, text content, or information by aggregating and/or structuring atomic units of data into particular platform-specific data structures (e.g., documents, projects, epics, and so on, (2) facilitate text, audio, or video communication, or (2) to facilitate any other suitable collaboration or communication purpose.

In this manner, a collaboration service increases efficiency of a team of individuals working on a common goal or project by increasing the speed by which information can be shared between team members, between supervisors and subordinates, and between management and staff. Further still, embodiments described herein increases efficiency of a multiplatform system by increasing the speed and convenience with which information is shared between platforms—integrations and/or manually copying information between platforms is not required, as all platforms leverage the same atomic data units owned by the organization to generate platform-specific objects/collections/sets of atomic data units, formatted in platform-specific ways.

To perform these functions, a collaboration service, however configured or used by a team of individuals or an organization, can implement a client-server architecture in which a host server or service associated with the collaboration service receives requests from and provides responses to (some or all of which may comply with a communication protocol such as HTTP, TCP, UDP, and the like) one or more client devices, each of which may be operated by a user of the collaboration service.

In other cases, a request-response architecture may not be required and other communication and information transaction techniques may be used. For simplicity of description, examples that follow reference a request-response architecture, but it may be appreciated that different collaboration services may be configured to serve and/or host information, including organization-owned data, in a number of suitable ways.

In these examples, more specifically, a host server supporting one or more functions of a collaboration service such as described herein can serve information, including organization-owned data, to a client device and, in response, the client device can render a graphical user interface on a display to present at least a portion of that organization-owned data to a user of that client device.

Software instances executing on the client device configured to render such graphical user interfaces can be referred to as frontend portions of a platform, as described herein. Correspondingly, servers and/or remote services configured to communicate with a frontend as described herein can be referred to as "backend" services. In many cases, each platform is associated with a respective frontend and a respective backend.

Each backend of each platform of a multiplatform computing environment (e.g., an environment defined by an organization that includes one or more collaboration tools) can be configured to communicably couple to one or more graph data structures as described herein, which may be configured to store platform-agnostic data as described above. For example, a single data storage system can be configured to instantiate a graph data structure as described herein which, in turn, can communicably couple to two or more platforms of a multiplatform computing environment.

For example, a collaboration service can serve an informational page for each project tracked by the collaboration service that provides contact information for a team of individuals responsible for working on that respective project. In another example, a collaboration service can host a page associated with a human resources department of an organization that provides a quick reference to a number of facts about that organization, such as the number or address of various offices, the names of executives, salary ranges for different positions, and so on.

Each of these items and documents can be assembled in real time, on demand, or by a node of a graph data structure as described herein, by aggregating one or more atomic data units stored by the graph data structure as described above. For example, the human resources department page may be rendered based on a JSON-formatted aggregation of multiple atomic data units, each of which stores office address information, executive name information, salary information, and so on.

These foregoing and other embodiments are discussed below with reference to FIGS. 1-6 However, those skilled in the art will readily appreciate that the detailed description given herein with respect to these figures is for explanation only and should not be construed as limiting.

FIG. 1 depicts a simplified system diagram of a multiplatform computing environment 100 leveraging a graph data structure to store platform-agnostic data as atomic data units that can be accessed by one or more software platforms and incorporated into objects/documents/pages of one or more software platforms, such as described herein.

Example software platforms that may include, without limitation messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant experience) of a particular software platform, including multimedia data such as images, audio files, or videos, can be considered organization-owned, content as described herein.

In the illustrated example, the multiplatform computing environment 100, which is merely one example of an architecture such as described herein, is implemented as a first party or third party cloud service, over virtual or physical hardware accessible at least in part over the open Internet. In some cases, the multiplatform computing environment 100 is implemented within a private network, such as an intranet defined for use by a single organization.

As may be appreciated by a person of skill in the art, a cloud service or network-accessible service can be physically architected in number of suitable ways. In one implementation, a request-response over TCP may be used. In another example, a WebSocket or other full-duplex server-client architecture may be used. In many cases, multiple physical resources may be leveraged to define one or more allocations of virtual resources, such as processor allocations or memory allocations.

It may be appreciated by a person of skill in the art that a processor allocation associated with a multiplatform computing environment, such as the multiplatform computing environment 100, may operate over one or more physical cores of one or more physical processors in one or more locations; regardless of configuration, however, a processor allocation as described herein can be configured to perform any suitable processing task associated with instantiation of, and/or operation of, one or more platforms or services of the multiplatform computing environment 100. Similarly, a memory allocation and/or a networking allocation may be associated with a multiplatform computing environment, such as the multiplatform computing environment 100, as described herein.

For simplicity of description and illustration, the multiplatform computing environment 100 is described herein as implemented/instantiated over a host service 102. The host service 102 communicably couples via one or more networking or wired or wireless communication protocols to a client device 104.

It may be appreciated that other client devices may be configured in a substantially similar manner as the client device 104, although this may not be required of all embodiments and different client devices can be configured differently and/or may transact data or information with, and/or provide input(s) to, the host service 102 in a unique or device-specific manner. The client device 104 can be any suitable personal or commercial electronic device and may include, without limitation or express requirement, a display 104a, volatile or non-volatile memory (identified, collectively, as the memory 104b), and a processor 104c. Example electronic devices include, but are not limited to: laptop computers; desktop computers; cellular phones; tablet computing devices; and so on. It may be appreciated that a client device 104, such as described herein, can be implemented in any suitable manner.

In many embodiments, the processor 104c of the client device 104 can be configured to execute one or more software applications (each referred to as "client applications") stored, at least in part, in the memory 104b. Each respective client application can be instantiated by the processor 104c. In particular, the processor 104c may access a persistent memory (e.g., of the memory 104b or of a separate memory structure) to retrieve one or more executable binary files and/or other computer-executable instructions (collectively, "assets" or "executable assets").

The processor 104c thereafter can load at least a portion of the retrieved assets into a working memory (e.g., of the memory 104b), thereby at least partially instantiating a respective one instance of a respective one client application. For simplicity of description an implementation in which the client device 104 is configured to execute/instantiate a single client application is described below.

As noted above, in embodiments, the host service 102 is configured to operate within or as a virtual computing environment that is supported by one or more physical servers including one or more hardware resources such as, but not limited to (or requiring) one or more of: a processor; a memory (also referred to as a working memory); non-volatile storage (also referred to as persistent memory); networking connections; and the like.

Specifically, it may be appreciated that although referred to as a singular "server", the host service 102 may be a cluster of different computing resources, which may be geographically separated from one another. In this manner, generally and broadly, both the host service 102 and the client device 104 can be referred to, simply, as "computing resources" that are communicably coupled to one another via a suitable network connection.

As used herein, the term "computing resource" (along with other similar terms and phrases, including, but not limited to, "computing device" and "computing network") may be used to refer to any physical and/or virtual electronic device or machine component, or set or group of interconnected and/or communicably coupled physical and/or virtual electronic devices or machine components, suitable to execute or cause to be executed one or more arithmetic or logical operations on digital data.

Example computing resources contemplated herein include, but are not limited to: single or multi-core processors; single or multi-thread processors; purpose-configured co-processors (e.g., graphics processing units, motion processing units, sensor processing units, and the like); volatile or non-volatile memory; application-specific integrated circuits; field-programmable gate arrays; input/output devices and systems and components thereof (e.g., keyboards, mice, trackpads, generic human interface devices, video cameras, microphones, speakers, and the like); networking appliances and systems and components thereof (e.g., routers, switches, firewalls, packet shapers, content filters, network interface controllers or cards, access points, modems, and the like); embedded devices and systems and components thereof (e.g., system(s)-on-chip, Internet-of-Things devices, and the like); industrial control or automation devices and systems and components thereof (e.g., programmable logic controllers, programmable relays, supervisory control and data acquisition controllers, discrete controllers, and the like); vehicle or aeronautical control devices systems and components thereof (e.g., navigation devices, safety devices or controllers, security devices, and the like); corporate or business infrastructure devices or appliances (e.g., private branch exchange devices, voice-over internet protocol hosts and controllers, end-user terminals, and the like); personal electronic devices and systems and components thereof (e.g., cellular phones, tablet computers, desktop computers, laptop computers, wearable devices); personal electronic devices and accessories thereof (e.g., peripheral input devices, wearable devices, implantable devices, medical devices and so on); and so on. It may be appreciated that the foregoing examples are not exhaustive.

As noted above, the host service 102 and the client application supported/executed by the client device 104 are communicably coupled via a suitable network connection which may be wired, wireless, or a combination thereof. In some examples, the network connection may include the open Internet.

In other cases, the network connection coupling the host service 102 and the client application may include only a private intranet managed by, or otherwise utilized by, an organization such as referenced above. The host service 102 and the client application can communicate according to any suitable protocol, form, or format. In many examples, the host service 102 at least partially exposes an API that can be accessed by the client application to perform one or more functions. For example, the client application may leverage the API to request organization-owned data (such as described herein) from the host service 102.

For simplicity of description, the embodiments that follow reference a configuration in which the host service 102 and the client application are configured to communicate and transact information according to a RESTful API, but it may be appreciated that this is merely one example and in other embodiments other signaling, communication, or data transaction methodologies may be used.

The host service 102 of the multiplatform computing environment 100 can be configured and/or implemented in a number of suitable ways. For example, as noted above, in many embodiments the host service 102 can leverage physical and/or virtual resources allocated to it to instantiate any suitable number of discrete subservices or purpose-configured modules, containers, virtual or physical networks, or virtual machines each configured to perform, coordinate, host, serve, or otherwise provide one or more services, functions, or operations of the multiplatform computing environment 100.

For example, the host service 102 of the multiplatform computing environment 100 can serve as infrastructure to instantiate a first software platform 106 and a second software platform 108, each associated with a respective resource allocation of virtual and/or physical processors, memory, networking, and so on. These resource allocations are identified in the figure as the resource allocations 106a, 108a respectively.

The host service 102 can also include a platform-agnostic data store 110, which may also be associated with a respective resource allocation of virtual and/or physical processors, memory, networking, and so on (e.g., the resource allocation 110a).

As with other embodiments described herein, the platform-agnostic data store 110 can be configured to instantiate a graph data structure, the nodes of which are or include an atomic data unit, such as described above.

As with many embodiments described herein, any atomic data unit stored by the platform-agnostic data store 110 can be accessed by each of the first software platform 106 and the second software platform 108. In some cases, a particular atomic data unit can be accessed by the first software platform 106 and presented in a first format and simultaneously or at a different time accessed by the second software platform 108 and presented in a second format. As a result of this architecture, the platform-agnostic data store 110 serves as single source of truth for substantially all data owned by an organization. In this manner, when data is changed or updated in a particular software platforms, any individual atomic data units associated with that update can be added to or modified in the platform-agnostic data store 110 such that future requests for that data will reflect the freshest data, regardless of which platform initiates the data update and regardless of which platform requests the data.

As noted above, an example atomic data unit may store tabular data in any form or format. When accessed by the first software platform 106, the tabular data may be presented in a frontend of the first software platform 106 in a graphical format, such as a pie chart. When accessed by the second software platform 108, the tabular data may be filtered according to some parameter, an average of a particular value may be taken, and the average may be presented in a frontend of the second software platform 108 as a numerical value, rounded to a predetermined precision.

These foregoing examples are not exhaustive. Any suitable data can be stored in or as an atomic data unit defined as a node of a graphical data structure instantiated by the platform-agnostic data store 110.

Similarly, the first and second software platforms can be configured in a number of ways and/or may serve different purposes. An example software platform is a messaging service. In this example, organization-owned data may be a message log attributed to or otherwise associated with a particular user of the messaging service. At some instant, the user may operate the client device 104 to initiate a request intended to be received by the messaging service to retrieve the message log. The message log may be returned in a platform-specific format, which can reference one or more atomic data units stored by the platform-agnostic data store 110. For example, each individual message can be stored as an atomic data unit.

In another example, a software platform may be a project management service. In this example, organization-owned data may be a set of documentation detailing one or more projects attributed to or otherwise associated with a particular user of the project management service. At some instant, the user may operate a graphical user interface rendered on the display 104a by the client application to initiate a request intended to be received by the project management service to retrieve the set of documentation detailing a selected project. In this example, the set of documentation can reference one or more atomic data units stored by the platform-agnostic data store 110. For example, one of the documents may reference a message created in the messaging service. In this example, the project management service and the messaging service can access the same data, and can present that data via each respective service's frontend.

These foregoing embodiments depicted in FIG. 1 and the various alternatives thereof and variations thereto are presented, generally, for purposes of explanation, and to facilitate an understanding of various configurations and constructions of a graph data structure and a platform-agnostic data store, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 2:
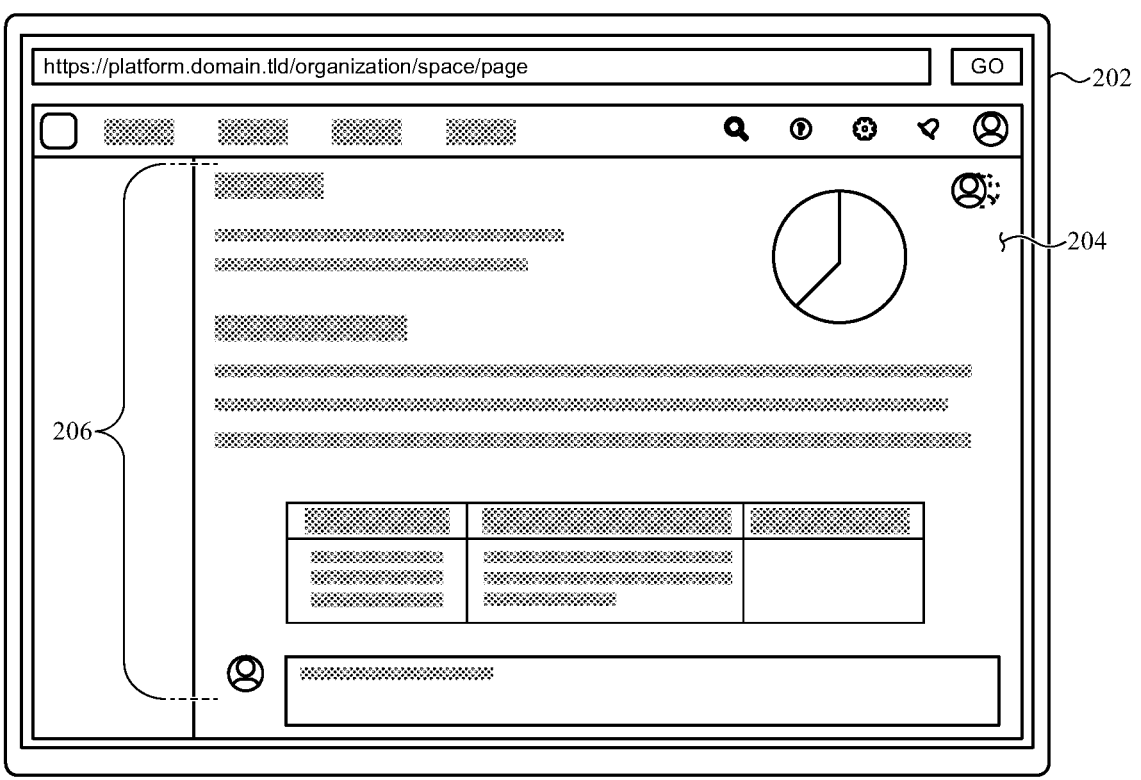
FIG. 2 depicts an example graphical user interface/frontend of a platform of a collaborative work environment, such as described herein.

FIG. 2 depicts an example graphical user interface/frontend of a platform of a collaborative work environment, such as described herein. The frontend can be associated with any suitable software platform as described herein.

The frontend can be rendered by a client device 200, which may be configured in the same manner as described above with reference to FIG. 1; this description is not repeated. The client device 200 can include a display 202 configured to be operated by a client application/frontend application in communication with a backend system associated with a particular software platform. The client application can receive data from the backend system and, in response, render a graphical user interface 204 including one or more graphical user interface elements 206. The graphical user interface elements 206 can be configured, presented, and arranged in a platform-specific manner, a user-specific manner, a localization-specific manner, or in any other suitable way. For example, content rendered by the graphical user interface 204 may be text content, multimedia content, graphical content, photos, line drawings, video content, animated content, and so on. More broadly, any content can be rendered by the graphical user interface 204, some or all of which may include a reference to an atomic data unit, such as described above.

For example, in one embodiment the software platform may be a collaboration tool such as a project management application. In this example, the frontend may receive inputs from a user of the client device 200, such as a selection of a project tracked by the project management system. In response to the user input, the client application can generate a request to a backend system associated with the project management application over a private network and/or over the public Internet.

In response to the request, the backend system can query a platform-specific datastore associated with the project management application in order to retrieve platform-specific information related to the requested project. In particular, the platform-specific datastore can return a platform-specific graph or mapping of atomic data units (and formats thereof) stored in a platform-agnostic datastore such as described above.

Figure 3:
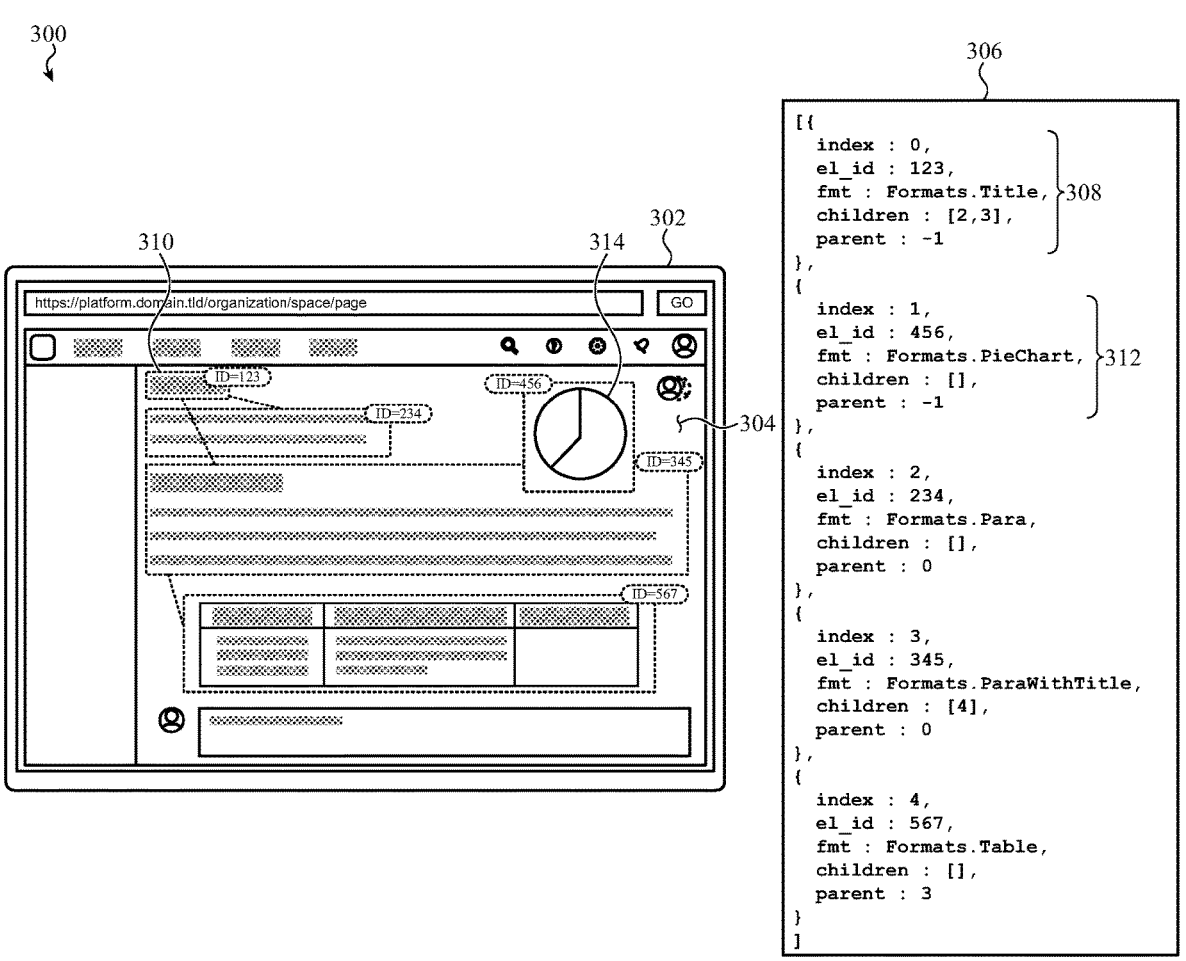
FIG. 3 depicts the graphical user interface of FIG. 2 generated by leveraging a platform-agnostic object graph, such as described herein.

For example, FIG. 3 depicts the graphical user interface of FIG. 2 generated by leveraging a platform-agnostic object graph, such as described herein. As with FIG. 2, the embodiment depicted in FIG. 3 includes a client device 300 that has a display 302 that can be operated by a frontend application to render a graphical user interface 304.

The graphical user interface 304 can be rendered at least in part in response to a request by a user of the client device 300 to access specific information. In response to the user request, a backend of the software platform (as noted above) is configured to query a platform-specific data store to retrieve a platform-specific mapping 306 of atomic data units. The platform-specific mapping 306 can taken any suitable form or format; in the illustrated embodiment the platform-specific mapping 306 is formatted as a JSON object, although it may be appreciated that this is merely one example.

The platform-specific mapping 306 (also referred to as a platform-specific graph) retrieved by the backend of the software platform lists and associates different atomic data units stored in a platform-agnostic data store such as described above. In the illustrated example, a reference 308 in the platform-specific mapping 306 to an atomic data unit with index 123 can cause the frontend to render a graphical user interface element 310. The reference 308 can defined one or more children elements of the atomic data unit with index 123, one or more parent nodes, one or more formats for displaying the atomic data unit and so on. These example attributes are not exhaustive; it may be appreciated that any suitable data can be stored in a platform-specific mapping such as described herein.

In addition, the platform-specific mapping 306 to an atomic data unit with index 456 can cause the frontend to render a graphical user interface element 314. In this example, a format attribute can inform the frontend to display the content of the atomic data unit with index 456 as a pie chart.

These foregoing simplified examples are not exhaustive; any suitable data and/or any suitable graphical user interface can be rendered by cooperation between platform-specific and platform-agnostic systems, such as described herein. As a result of these architectures, atomic data units of organization-owned data can be rendered in any suitable platform in a multiplatform computing environment.

Figure 4:
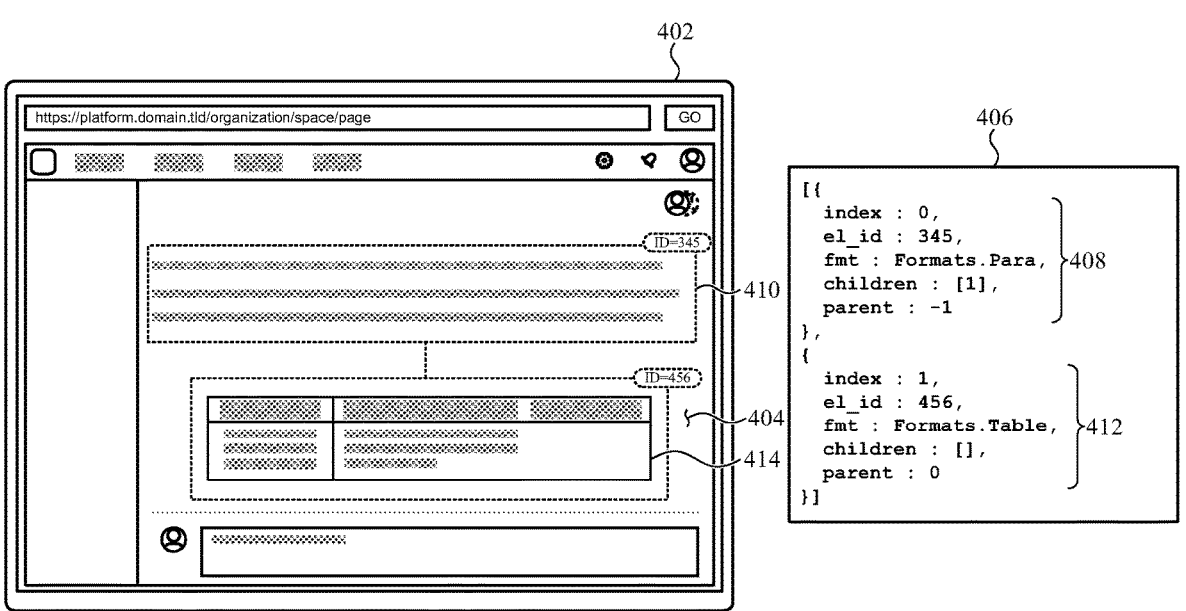
FIG. 4 depicts an example graphical user interface/frontend of a platform of a collaborative work environment generated by leveraging a platform-agnostic object graph, such as described herein.

For example, FIG. 4 depicts an example graphical user interface/frontend of a platform of a collaborative work environment generated by leveraging a platform-agnostic object graph, such as described herein. In this example embodiment, a client device 400 includes a display 402 that is leveraged by a frontend application different from the frontend application of FIGS. 2-3, to render a graphical user interface 404. In this embodiment, in response to a user input, the frontend application can signal an associated backend application to access a platform-specific mapping 406 that includes two references to atomic data units also referenced by the platform-specific mapping 306 of FIG. 3. In this example, the platform-specific mapping 406 includes a reference 408 to the atomic data unit with index 345 that in turn can cause the frontend to render a graphical user interface element 410 according to a format specific to the platform-specific mapping 406. In addition, the platform-specific mapping 406 also includes a reference 412 to the atomic data unit with index 456 that in turn can cause the frontend to render a graphical user interface element 414 according to a format specific to the platform-specific mapping 406. In this example, the same atomic data unit referenced in FIG. 3, atomic data unit with index 456 can be rendered as a table.

These foregoing embodiments depicted in FIGS. 2-4 and the various alternatives thereof and variations thereto are presented, generally, for purposes of explanation, and to facilitate an understanding of various configurations and constructions of a system that includes both platform-specific data stores and platform-agnostic data stores, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
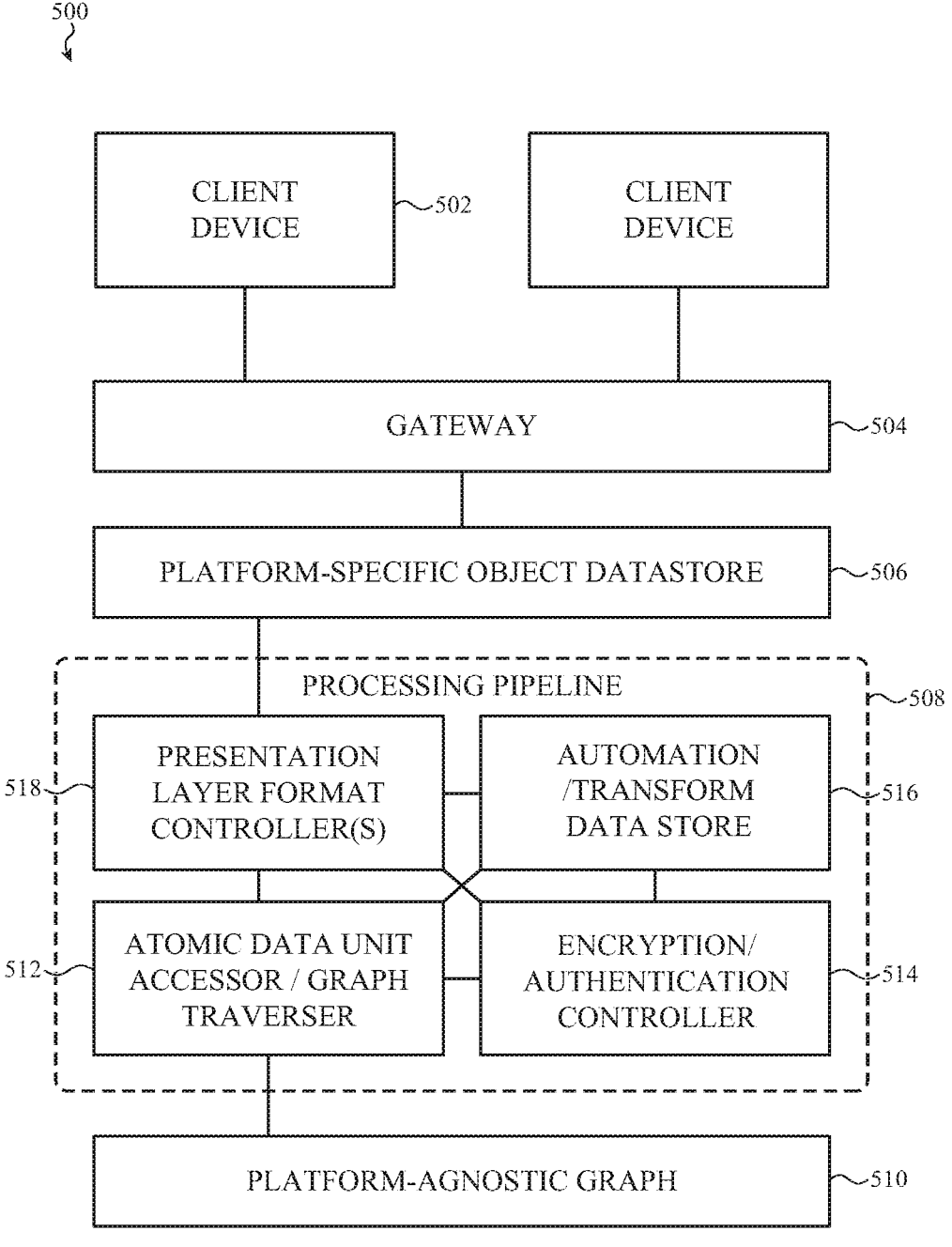
FIG. 5 depicts one example simplified system diagram of a system as described herein.

For example, in some embodiments, an architecture as described herein can also include one or more data processing pipelines configured to format content and data of one or more atomic data units. FIG. 5 depicts a simplified system diagram of a system as described herein.

FIG. 5 depicts a system 500, as described herein. A client application executing on a client device 502 (which may be one of many client devices) can communicate a request for data to display to a user of the client device 502. The request can be received by a gateway service 504 configured to route the request to an appropriate backend system associated with the client application/frontend application.

In an embodiment, the gateway service 504 routes the request from the client device 502 to a platform-specific object map datastore 506, which stores platform-specific graphs, maps, or other aggregations of atomic data units. The platform-specific object map datastore 506 may be communicably coupled in many embodiments to a processing pipeline 508 which interposes the platform-specific object map datastore 506 and a platform-agnostic graph 510 that stores atomic data units, as described herein.

As a result of this construction, a request from the client device 502 can be received by the gateway service 504 which, in turn, may query the platform-specific object map datastore 506. In response, the platform-specific object map datastore 506 can provide as output an object map that logically associates and/or references one or more atomic data units stored in the platform-agnostic graph 510. The object map can also define one more format attributes that define how data retrieved from the platform-agnostic graph 510 should be presented, visualized, or otherwise rendered by the client device 502.

The processing pipeline 508 can include a number of suitable submodules or functional blocks that may be implemented as serverless functions (e.g., lambda functions). In other cases, the functions and features of the processing pipeline 508 can be implemented as discrete addressable services instantiated over physical or virtualized hardware with suitable allocations (e.g., processor, memory, storage, network, and so on).

In one example, the processing pipeline 508 includes an atomic data unit accessor/graph traverser 512 configured to access the platform-agnostic graph 510 to retrieve one or more atomic data units therefrom. In some cases, the atomic data unit accessor/graph traverser 512 is configured to query a graph data structure instantiated by the platform-agnostic graph 510 to retrieve multiple interconnected atomic data units, such as data units that cross-reference or that are logically associated via edges coupling said the units in the graph data structure.

In addition to the atomic data unit accessor/graph traverser 512, the processing pipeline 508 can include an encryption/authentication controller 514 configured to manage permissions and access to individual atomic data units stored in the platform-agnostic graph 510.

In addition to the atomic data unit accessor/graph traverser 512, the processing pipeline 508 can include a automation/transform controller and datastore 516 configured to modify data stored in an atomic data unit in a particular manner. For example, the automation/transform controller and datastore 516 can be configured to cast data into particular data objects (e.g., strings into integers, strings into arrays, strings into dates, strings into numbers/floats/integers, dates into strings, and so on), to generate metadata, to generate data sets, to extract one or more elements from the data unit, and so on. A person of skill in the art may readily appreciate any suitable data transformations are possible.

In addition to the automation/transform controller and datastore 516, the processing pipeline 508 can include a presentation layer format controller 518 configured to define format and/or styling of one or more atomic data units or one or more outputs of the automation/transform controller and datastore 516.

These foregoing embodiments depicted in FIG. 5 and the various alternatives thereof and variations thereto are presented, generally, for purposes of explanation, and to facilitate an understanding of various configurations and constructions of a system architecture, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, in some cases, a graph data structure as described herein can be leveraged to automatically update multiple frontends currently rendering a graphical user interface that includes a graphical user interface element that is based at least in part on an atomic data unit that has been updated.

FIG. 6 is a flowchart depicting example operations of a method of operating a platform-agnostic object graph/data store as described herein. The method 600 includes operation 602 in which a signal is received that indicates that an atomic data unit has been updated. At operation 604, all children data units of the atomic data unit can be signaled to updated. Similarly, at operation 606, all parent data units of the atomic data unit can be signaled to update. Finally, at operation 608, optionally, frontends rendering a graphical user interface element based on the atomic data unit can be updated and/or signaled to update or refresh.

Figure 7:
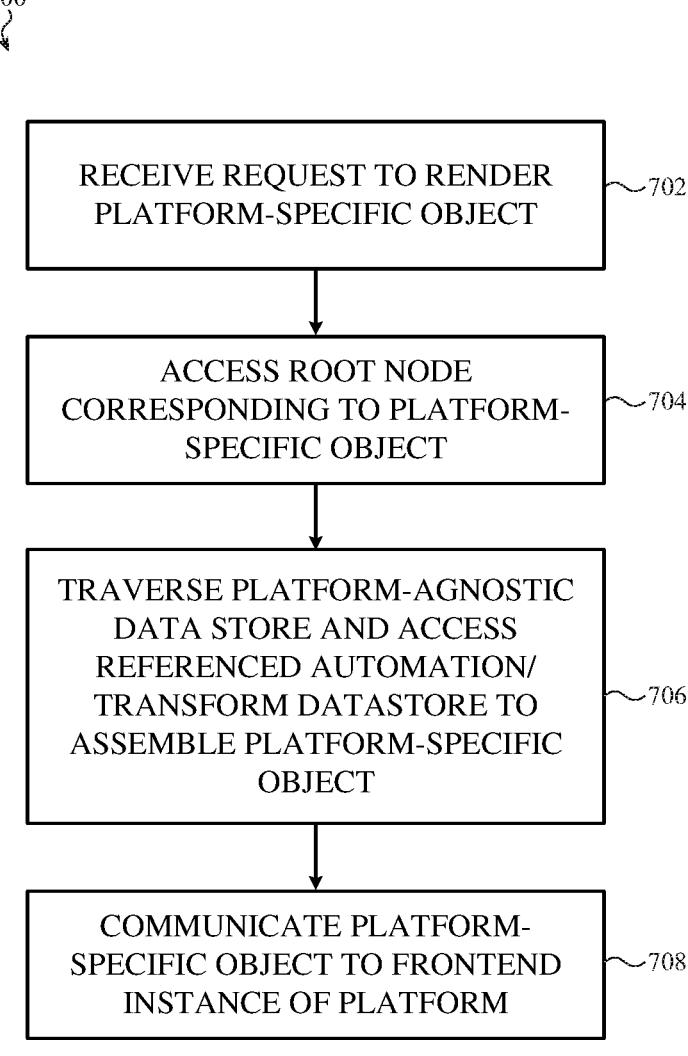
FIG. 7 is a flowchart depicting example operations of a method of operating a platform-agnostic object graph/data store as described herein.

FIG. 7 is a flowchart depicting example operations of a method of operating a platform-agnostic object graph and/or data store as described herein. In particular, the method 700 includes operation 702 at which a request to render or otherwise present (e.g., in a frontend of a particular platform) a platform-specific object. Next, at operation 704, a root node associated with and/or corresponding to that object can be identified and accessed. The root node may reference one more child nodes and/or one or more automations or transformation nodes. For example, a documentation system object root node may reference a child object that represents a first paragraph of text. The child object may be an atomic data unit as described herein, stored as plain text. In addition, the child object and/or the root node may reference an automation/transform node that receives the text of the child object as input and provides as output an HTML-formatted paragraph object (e.g., text content enclosed in a <p></p> tag pair) that references one or more styles, such as CSS styles. The automation/transform node provides a formatted HTML output that can be displayed in a frontend configured to render HTML content.

The method 700 also includes operation 706 at which all objects/nodes referenced by the root node and child nodes thereof are accessed, along with any referenced automations or transforms, such as described above. Each accessed object can be assembled into a single platform-specific object.

The method 700 further includes operation 708 at which the assembled platform-specific object may be communicated to a frontend for rendering to a user.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

Further, many foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on. The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

In addition, it is understood that organizations and/or entities responsible for the access, aggregation, validation, analysis, disclosure, transfer, storage, or other use of private data such as described herein will preferably comply with published and industry-established privacy, data, and network security policies and practices. For example, it is understood that data and/or information obtained from remote or local data sources, only on informed consent of the subject of that data and/or information, should be accessed aggregated only for legitimate, agreed-upon, and reasonable uses.

What is claimed is:

1. A method for storing platform-agnostic data and constructing platform-specific documents in a multi-platform computing environment, the method comprising:

receiving a request to display a platform-specific document object in a frontend of a respective documentation tool of the multi-platform computing environment, the platform-specific document object identified by an identifier;

in response to the request, querying a platform-specific datastore with the identifier to retrieve a set of atomic data units that define content of the platform-specific document object, the atomic data units accessible to both of the documentation tool of the multi-platform computing environment and an issue tracking tool of the multi-platform computing environment, wherein at least one atomic data unit of the set of atomic data units defines content of a platform-specific issue tracking data of the issue tracking tool;

querying a platform-agnostic graph data store to retrieve each atomic data unit defining the platform-specific document and at least one transformation node associated with the platform-specific document object;

constructing, for the documentation tool of the multi-platform computing environment, the platform-specific document object from the retrieved atomic data units, the construction comprising an execution of the at least one transformation node with respect to at least one atomic data unit of the set of atomic data units; and causing the platform-specific document object to be rendered as a graphical user interface element in the frontend of the documentation tool of the multi-platform computing environment.

2. The method of claim 1, wherein constructing the platform-specific document comprises performing a transform defined by the transformation node to a data attribute of a respective first atomic data unit of the retrieved atomic data units.

3. The method of claim 2, wherein the transform comprises formatting or modifying text content of the respective first atomic data unit.

4. The method of claim 2, wherein the transform comprises modifying media content of the respective first atomic data unit.

5. The method of claim 2, wherein the transform comprises pivoting tabular data content of the respective first atomic data unit.

6. The method of claim 2, wherein the transform comprises filtering tabular data content of the respective first atomic data unit.

7. The method of claim 2, wherein the transform comprises extracting, calculating, or generating a metadata value from data content of the respective first atomic data unit.

8. The method of claim 2, wherein the transform comprises generating a visual representation of tabular data content of the respective first atomic data unit.

9. The method of claim 1, wherein querying the platform-agnostic graph data store includes, in response to the query, authenticating a permission to access at least one of the atomic data unit nodes associated with the platform-specific document.

10. The method of claim 1, wherein retrieving each atomic data unit node includes traversing the platform-agnostic graph data store to retrieve one or more interconnected atomic data units associated with each atomic data unit.

11. A data management system for storing and retrieving platform-agnostic data in a multi-platform computing environment, the data management system comprising:

a platform-agnostic object store of a host service that includes one or more servers;

a processor allocation to instantiate an instance of a documentation tool controller on the one or more servers of the host service, the documentation tool controller configured to:

receive a platform-specific object request from a frontend providing client-side functionality of the documentation tool;

query a platform-specific data store for a platform-specific object map corresponding to a platform-specific object indicated by the platform-specific object request;

receive the platform-specific object map identifying, by reference:

a set of atomic data units that define content of the platform-specific object, each atomic data unit node of the set of atomic data units stored in the platform-agnostic object store, the set of atomic data units object accessible to both of the documentation tool controller of the multi-platform computing environment and a issue tracking tool controller of the multi-platform computing environment, wherein at least one atomic data unit of the set of atomic data units defines content of a platform-specific issue tracking data of the issue tracking tool;

retrieve the set of atomic data units from the platform-agnostic object store and at least one transformation node associated with the platform-specific object;

constructing a platform-specific object from the retrieved set of atomic data units, the construction comprising an execution of the at least one transformation node with respect to at least one atomic data unit of the set of atomic data units; and cause display, within a graphical user interface of the frontend, of the platform-specific object.

12. The data management system of claim 11, wherein the platform-specific object map identifies, by reference, an object type of the platform-specific object.

13. The data management system of claim 11, wherein the at least one transformation node, when executed:

modifies text content of the at least one atomic data unit;

formats data content of the at least one atomic data unit;

filters tabular data content of the at least one atomic data unit; or generates a visualization of tabular data content of the at least one atomic data unit.

14. The data management system of claim 13, wherein the at least one transformation node is executed by the documentation tool controller.

15. The data management system of claim 13, wherein the at least one transformation node is executed by the frontend.

16. The data management system of claim 13, wherein a first stage of the at least one transformation node is executed by the documentation tool controller and a second stage of the at least one transformation node is executed by the frontend.

17. The data management system of claim 11, wherein the processor allocation to instantiate the instance of the documentation tool controller is further configured to:

in response to the request, authenticate a permission to access at least one of the atomic data unit nodes associated with the platform-specific object.

18. The data management system of claim 11, wherein the processor allocation to instantiate the instance of the documentation tool controller is further configured to:

traverse a platform-agnostic graph data store to retrieve one or more interconnected atomic data units associated with each atomic data unit.

* * * * *